(12) United States Patent
Grall

(10) Patent No.: US 8,345,878 B2
(45) Date of Patent: Jan. 1, 2013

(54) METHOD FOR DISTRIBUTING CRYPTOGRAPHIC KEYS IN A COMMUNICATION NETWORK

(75) Inventor: Eric Grall, Brest (FR)

(73) Assignee: Thales, Neuilly-sur-Seine (FR)

( * ) Notice: Subject to any disclaimer, the term of this patent is extended or adjusted under 35 U.S.C. 154(b) by 371 days.

(21) Appl. No.: 12/675,667

(22) PCT Filed: Aug. 27, 2008

(86) PCT No.: PCT/EP2008/061257
§ 371 (c)(1),
(2), (4) Date: Mar. 12, 2010

(87) PCT Pub. No.: WO2009/027447
PCT Pub. Date: Mar. 5, 2009

(65) Prior Publication Data
US 2011/0129090 A1    Jun. 2, 2011

(30) Foreign Application Priority Data

Aug. 31, 2007    (FR) ...................................... 07 06126

(51) Int. Cl.
*H04L 29/06* (2006.01)
(52) U.S. Cl. ........................................ 380/278; 713/171
(58) Field of Classification Search .................. 380/278; 713/171
See application file for complete search history.

(56) References Cited

U.S. PATENT DOCUMENTS

| | | | |
|---|---|---|---|
| 6,182,214 B1 * | 1/2001 | Hardjono | 713/163 |
| 2003/0072059 A1 * | 4/2003 | Thomas et al. | 359/167 |
| 2003/0084020 A1 * | 5/2003 | Shu | 707/1 |

FOREIGN PATENT DOCUMENTS

WO    2006/071239 A2    7/2006

OTHER PUBLICATIONS

Guédon, JeanPierre et al., "The Mojette Transform: The First Ten Years" DCGI 2005, LNCS 3429, pp. 79-91.*
B. Parrein, et al., "Multimedia Forward Error Correcting Coes for Wireless LAN", Annals of Telecommunications, Get Lavoisier, Paris, FR, vol. 58, No. 3/04, Mar. 1, 2003, pp. 448-463, XP001170095.
B. Parrein, et al., "Multiple Description coding Using Exact Discrete Radon Transform", Proceedings DCC 2001. Data Compression Conference IEEE Comput. Soc Los Alamitos, CA, USA, 2001, p. 508, XP002479414.

* cited by examiner

*Primary Examiner* — Michael Pyzocha
(74) *Attorney, Agent, or Firm* — Baker & Hostetler LLP

(57) ABSTRACT

A method for generating one or more cryptographic keys between users A and B, in which A generates a public value sensitive to a MIM attack and decomposes it into m segments of redundancy o, and transmits this concatenated information with a reference message $N_a$ over the network via k routing paths and vice versa for B, A and B regenerate the common secret by recalculating the inverse transform of all the combinations of o segments and by choosing the value that is statistically most represented, $g^{ab\sim}$ for A, and $g^{\sim ab}$ for B, A sends a verification message corresponding to $N_b$ from B encrypted with $g^{ab\sim}$ and sends it to the party B, B decrypts the message from A with $g^{\sim ab}$ and checks consistency with $N_b$, then refers to the acknowledgment message in the same way: $\{N_a\}$ $g^{\sim ab}$ to validate the common secret between the two entities.

7 Claims, 2 Drawing Sheets

FIG.4
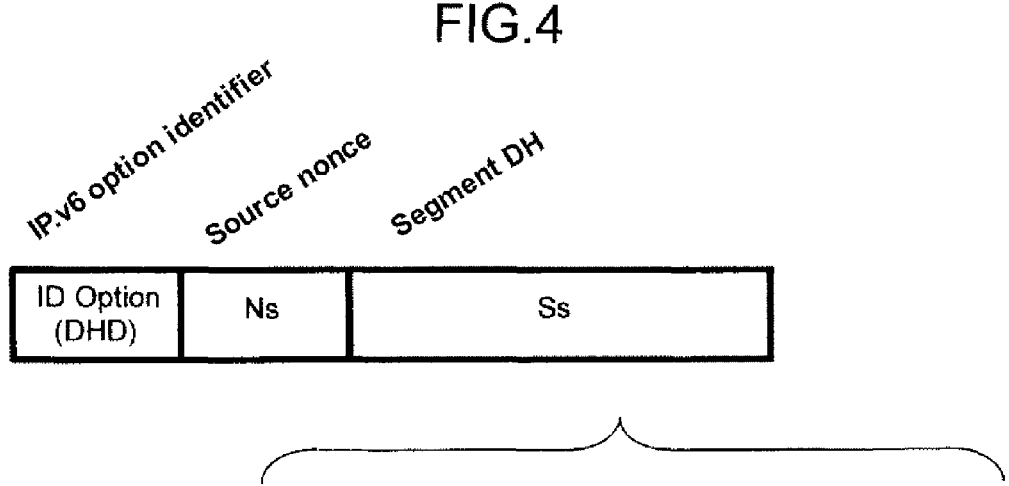
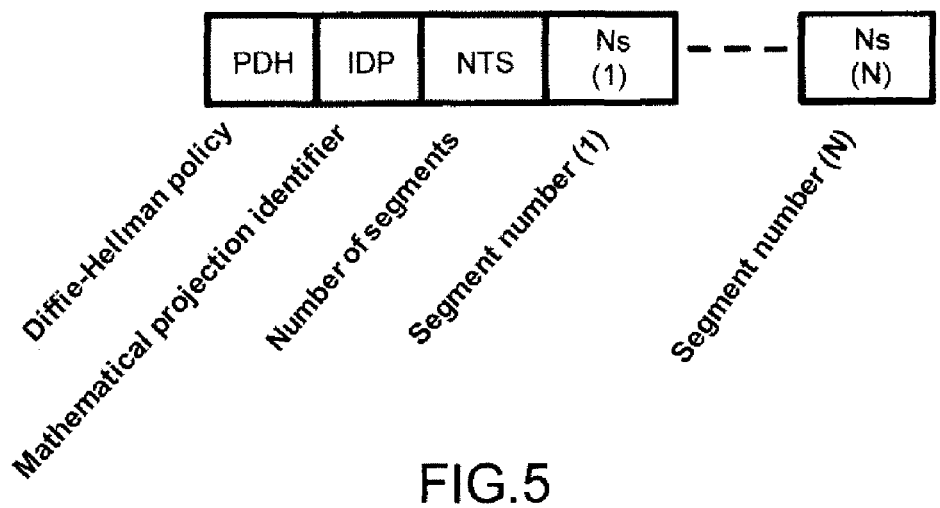
FIG.5

METHOD FOR DISTRIBUTING CRYPTOGRAPHIC KEYS IN A COMMUNICATION NETWORK

CROSS-REFERENCE TO RELATED APPLICATIONS

This application is a National Stage of International patent application PCT/EP2008/061257, filed on Aug. 27, 2008, which claims priority to foreign French patent application No. FR 07 06126, filed on Aug. 31, 2007, the disclosures of which are hereby incorporated by reference in their entirety.

FIELD OF THE INVENTION

The present invention relates to a distributed negotiation protocol for cryptographic keys.

It applies, notably, to the security of interchanges between the entities of a communication network. This network can be a highly redundant fixed network, that is to say that it comprises a number of routing paths, or else an ad hoc network. The ad hoc networks are formed via the self-configuration of the routing tables of each of the communicating nodes that form an integral part of the network.

BACKGROUND OF THE INVENTION

In a fixed network, the problem of security is normally resolved via key management infrastructure systems, designated by the abbreviation KMI, that can be used to share a key or a certificate between the entities of the communicating network. This generalization is not always desirable given the complexity in implementing such an infrastructure. In this context the system for securing a channel between two users needs to be able to cope with a large number of attacks without the external assistance of an KMI.

In an ad hoc network, the problem is all the greater since the concept of key infrastructures is virtually nonexistent because of the very mobility and volatility of the ad hoc topology. In practice, an ad hoc network is a network in which the information is routed by the nodes that make up the network. There are no fixed routing infrastructures from which to know the overall topology of the network. Each of the nodes of the network behaves like a router with its neighbors. In this context, there are several orders of technical problems to be resolved: each of the nodes needs to be able, at a given instant, to know a portion of the topology of the network in order to be able to communicate with a recipient node. This problem is partly resolved by so-called proactive protocols that establish the routes in advance using a periodic management of the routing tables and the reactive protocols that look for the routes on request; in the latter case, the source node and/or the recipient nodes are equipped with tables and routing protocols making it possible to determine the paths to be taken by a message.

Confidence in the network is one of the major problems in the context of ad hoc networks. In practice, the routing information and the user information circulate via private communication nodes, and therefore with zero confidence level. Since an ad hoc network is by its nature mobile, no confidence system, no public key infrastructure, can be implemented in this context. In practice, the validation must be done by the confidence system.

The prior art, known to the Applicant, relates to the protocol for exchanging keys via the internet that is better known by the abbreviation IKE, for Internet Exchange Key, that makes it possible to calculate a common secret in order to secure the exchange between two entities. This protocol is described in the IETF publication RCF 2409 available at the following internet address: http://www.ietf.org/rfc/rfc2409.txt. Although it is effective, this protocol presents the following drawbacks:

the length of the exchanges between the two parties results in an overload in the network bandwidth, it allows for the secret to be verified only from a key or from a certificate that is pre-shared via an organizational means outside of any communication, this protocol is not adapted to management of the ad hoc network and it is therefore vulnerable to an attack that consists in having a malicious person pass himself off for the pair of each of the two users of the communication, by generating a secret instead of the final users, better known by the abbreviation MIM (Men-In-the-Middle).

In the context of an ad hoc network, it is also known to implement protocols based on the ring certification of communicating nodes, and the decomposition of the private key by a polynomial mathematical operation. Similarly, one of the drawbacks in group certifications for each ring is the abovementioned MIM capability at the ring level.

More generally, the abovementioned state of the art makes it possible to share a common secret between two entities of a fixed network, via a simple routing link. However, this secret is validated by the encryption and the verification of said secret by a pre-shared key or by a certificate supplied by a key management infrastructure (KMI or public key infrastructure PKI).

In the context of centralized networks, the confidence between the players is implemented via certificates or signatures, deployed from public key management infrastructures (KMI). This mechanism allows a so-called certification authority to validate the confidence of the information between the various certified users. Confidence is therefore located at the level of a single entity, combining the functionalities of certification, validation and revocation of the users or equipment combined within a determined group holding valid certificates.

This security strategy in a network operating with the internet protocol, or IP, is therefore based on the centralization of the confidence in a single node of the network, and a broadcasting of this confidence in the form of certificates using administrative methods (chip cards, USB key, etc.).

Outside of this context, there are a number of cryptographic mechanisms that make it possible to share a common secret, via a zero disclosure method.

One of these principles or mechanisms is the Diffie-Hellman protocol, denoted DH in the description, implemented in the abovementioned IKE protocol. This principle, which will be reviewed in the following paragraph, presents MIM as its main fault.

The Diffie-Hellman protocol is reviewed in FIG. 1. The theoretical concepts of public key cryptography go back to the article published by Diffie and Hellman in 1976 (W. Diffie-M. E. Hellman: New Directions in cryptography. IEEE Trans. on Information Theory, Vol. IT-22-6, November 1976). The main result of this founding article is the possibility of two users, who are communicating via an unsafe network, agreeing on a session key that is intended to encrypt their subsequent communications.

Let $G=\langle g \rangle$ be a cyclical group. The two parties $U_1, U_2$ each choose, at random, $x_1, x_2$ belonging to the cyclical group G respectively and exchange the values $g^{x_1}, g^{x_2}$ over the network. The user $U_1$ (respectively $U_2$) then calculates the Diffie-Hellman secret $g^{x_1 x_2}$ by receiving the message from $U_2$ (respectively $U_1$). This assumption stipulates that, given three values $g^{x1}, g^{x2}, g^r$, a polynomial adversary cannot decide with a significant advantage whether $g^r = g^{x1x2}$ or not.

The known MIM attack is presented in FIG. 2. One or more malicious users H place themselves between the two parties $U_1$, $U_2$, and will take over relaying the information from one to the other. FIG. 2 represents the case in which there is only one malicious third party. When $U_1$ exchanges his value $g^{x1}$ over the network addressed to $U_2$, the attacker H will pass himself off as $U_2$ and reply in his place via a secret $g^h$. He will do the same for the party $U_2$. In this context, the two parties will communicate via a pseudo-confidential channel via the attacker H with the common secrets, between $U_1$ and H: $g^{x1.h}$ and between $U_2$ and H: $g^{x2.h}$.

One aim of the invention is to offer a solution to the confidence problems between at least two entities of a network.

SUMMARY OF THE INVENTION

The object of the invention relates, notably, to a distributed negotiation protocol for keys via a distribution mechanism that is redundant and insensitive unitarily to a public value sensitive to the abovementioned attack, this value enabling each of the participants to generate a common secret, over a dynamic set of routing paths in a target network. The network can be an ad hoc network or else a fixed network. The set of the routing paths can be fixed on starting or evolve over time.

The object of the invention relates to a method making it possible to distribute elements for generating one or more cryptographic or encryption keys between at least two users A and B in a network comprising a number of nodes Ni interlinked by means of communication highways, the network implementing a routing protocol, wherein it comprises at least the following steps:

- to communicate with B, A generates a public value that is sensitive to a malicious attack in which a third party seeks to pass himself off as a participant in the network, or "MIM", and decomposes it using a mathematical transformation into m segments of redundancy o, that is to say that an information item can be recomposed from o segments, and transmits this concatenated information with a reference message $N_a$ over the network via k routing paths,
- to communicate with A, B generates a public value that is sensitive to an MIM attack and decomposes it using a mathematical transformation into m segments of redundancy o, that is to say that an information item can be recomposed from o segments, and transmits this concatenated information with a reference message Nb over the network via k routing paths,
- the two parties A and B regenerate the common secret by recalculating the inverse transform of all the combinations of o segments and by choosing the value that is statistically most represented: $g^{ab\sim}$ and $g^{\sim ab}$
- once the two secrets assumed to be common have been calculated, $g^{ab\sim}$ for A, and $g^{\sim ab}$ for B, the party A sends a verification message corresponding to the reference message $N_b$ from B encrypted with the common secret: $g^{ab\sim}$ and sends it to the party B: $\{N_b\}g^{ab\sim}$, B then decrypts the message from A with his key $g^{\sim ab}$ and checks consistency with his reference message $N_b$, then refers to the acknowledgment message in the same way: $\{N_a\}g^{\sim ab}$ to validate the common secret between the two entities, and to use the common secret to encode a message.

The reference message $N_a$, $N_b$ for the parties A and B is, for example, a random variable.

BRIEF DESCRIPTION OF THE DRAWING

Other characteristics will become apparent from reading the following detailed description, given by way of nonlimiting example, and in light of the appended drawings that represent:

FIG. 4, the structure of the DHD protocol according to the invention native in an ad hoc network, and FIG. 5, the structure of the DHD protocol incorporated in version 6 of the protocol or IP.v6 optionally.

DETAILED DESCRIPTION

Figure 1:
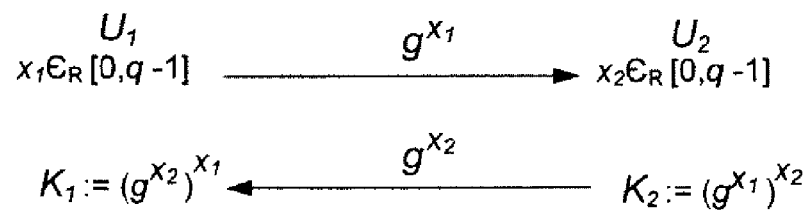
FIG. 1, a diagram relating to the Diffie-Hellman protocol.
Figure 2:
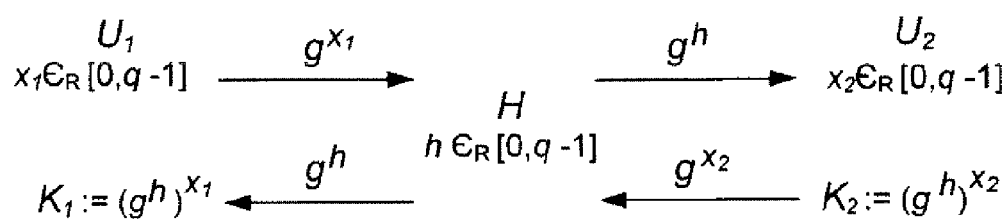
FIG. 2, an exemplary MIM-type attack on the Diffie-Hellman protocol.

In order to better understand the principle of the method and of the system according to the invention, the example given hereinbelow in a nonlimiting manner is based on the mechanism of decomposing and recomposing the Diffie-Hellman information, and its distribution over an ad hoc network comprising a number of nodes Ni interlinked by means of communication highways, a source A and a recipient B. The mechanism for distributing and broadcasting the public Diffie-Hellman value via a number of routing paths makes it possible to disperse the possibility of an attack on the communication between the two entities at the moment of the negotiation of the key that follows the encryption of the communication channel.

Any other cryptography mechanism, not involving the Diffie-Hellman mechanism, can be used.

FIG. 4 illustrates the principle implemented by the inventive method. The example is given as a nonlimiting example for the case of an ad hoc network of high density. This example may correspond to the networks that will exist in the major cities in a few years. The network could also be a fixed network comprising a sufficient number of paths to execute the steps of the method according to the invention. The routing paths taken by the portions of the calculated public value are, preferably, unconnected paths, that is to say that they do not include nodes Ni in common. In the case where the network comprises pseudo-unconnected paths, the method allows for a percentage of nodes to cross.

In this example, the method comprises a number of steps detailed hereinbelow:

a) the method calculates a public value sensitive to the predefined MIM of Diffie-Hellman type, for example, then parcels out this value calculated by a Diffie-Hellman exponentiation, for example, by a Mojette mathematical transform, a description of which can be found in the article by Jean-Pierre Guédon, at the IRCCyN seminar in June 2001, available from the website Jean-Pierre.Guédon@irccyn.ec-nantes.fr, by the two entities that exchange information (entity that sends the information and entity that will receive it). Instead of the Mojette transform, it is possible to use a Reed-Solomon code or any type of processing that offers functions similar to those of the Mojette function. The public value is used to construct the secret value or secret shared by the users.

b) the next step consists in communicating, over a number of routing paths between the two entities, one or more portions of the public value sensitive to the MIM over a given path, and, for example, a random variable unique to all the paths associated with each of the entities; the routing channel comprising the paths and the nodes taken by the various portions of the public value is chosen according to the network type. In the case of a proactive network, it is the sender or source that chooses the path, the latter having been stored when the system was initialized or started up. In the case of a wired network, the modifications that make it possible to choose a route at the level of a node are chosen via a label, for example MPLS.

c) the third step comprises the synchronization of the common secret by the inverse Mojette calculation of the common secret via the portions recovered over the various paths, by using the inverse calculation of the mathematical transformation used in the first step, then the verification of this secret via the encryption by the common secret of a respective random variable of each of the entities, and the communication of this encrypted data between the partners. For example, the sender A generates a public value that is transmitted to a second entity B, in order for the latter to be able to calculate the value of the common secret. The value of the common secret is obtained by implementing the inverse Mojette transform, for example, of all the combinations of o segments, o corresponding to the redundancy used, and by choosing for each, A and B, the value that is statistically the most represented. This operation is performed for A and for B individually. Then, A and B verify that the two values found are identical. In the case where they match, A and B then use this value as the encryption key. Otherwise, there may be a suspicion of a malicious intrusion into the communications between A and B.

The Mojette transform is a discrete Radon mathematical transform that makes it possible to project a data set from a space of dimension N on to a space of dimension N−1. This transform has the necessary "parceling out" and "security" properties in the protocol context. It is also possible to use the Reed-Solomon transform instead of the Mojette transform. The transformation used in the method according to the invention offers the particular feature of generating redundancy. This redundancy is distributed over the segments resulting from the decomposition of the sensitive public value into a number of portions. The choice of the redundancy value to be used is defined, for example, according to the number of paths that may be attacked.

Figure 3:
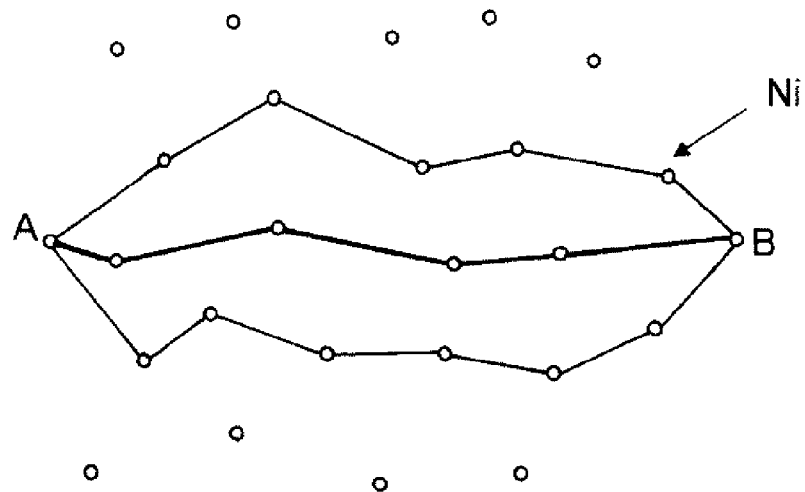
FIG. 3, a multi-path routing in the ad hoc network.

To give detail, the distributed method for negotiating keys according to the invention comprises at least the following steps:

In order to better focus the ideas, an ad hoc network, of size N, is considered, with two parties A and B communicating via k unconnected or partially unconnected paths (see FIG. 3). These paths will be chosen in the topological database of each of the two communicating nodes A and B, via the implementation of a path discovery protocol based on a proactive mode according to the principles known to those skilled in the art and that will therefore not be detailed here. The intermediate nodes act as routers and transmit a packet to the next node, and do so by following the routing paths predefined or defined in real time, as mentioned hereinabove.

The distributed protocol for negotiating keys will then be described by the following phases:

to communicate with B, A generates a public value that is sensitive to the MIM according to the DH protocol, for example $g^a$, and decomposes it into m segments of redundancy o (that is to say that the information item can be recomposed from o segments), with o<m: $g^{a1}$ $g^{a2}$ $g^{a3}$ $g^{a4}$ ... $g^{am}$, via the Mojette mathematical transform M, and sends this concatenated information with a message enabling it to be identified (better known by the term nonce) $N_a$ over the network via the k routing paths. The transmitted message $N_a$, therefore the random variable, notably makes it possible for each of the entities to verify the veracity of the choice of the statistical value of the common secret.

$$g^a \to M(g^a) = g^{a1} g^{a2} g^{a3} g^{a4} \ldots g^{am}$$

In the case where k=m, there are:
path 1 data: $g^{a1} \| N_a$
path 2 data: $g^{a2} \| N_a$
...
path k data: $g^{am} \| N_a$ In the case where k<m, there may be a number of concatenated packets:
path 1 data: $g^{a1} \| g^{ai} \| N_a$
path 2 data: $g^{a2} \| g^{aj} \| N_a$
...
path k data: $g^{am} \| g^{al} \| N_a$ In the case of an attack on a portion of the paths or of a loss in QoS of a portion of the paths, B recovers a certain number of unmodified segments: $g^{ai}$ $g^{ai+1}$ ... $g^{ai+l}$ and recovers j segments modified either by an attacker, or by a network error: $g^{h1}$ $g^{h2}$ ... $g^{hj}$, with j+l<m.

Similarly, to communicate with A, B generates a public value that is sensitive to the MIM according to the Diffie-Hellman protocol DH $g^b$, and decomposes it into m segments of redundancy o (that is to say that the information item can be recomposed from o segments), with o<m: $g^{b1}$ $g^{b2}$ $g^{b3}$ $g^{b4}$ ... $g^{bm}$, via the Mojette mathematical transform M, and sends this concatenated information with a message $N_b$ enabling it to be identified (known by the term nonce) over the network via the k routing paths. The transmitted message $N_b$, and therefore the random variable, notably enables each of the entities to verify the veracity of the choice of the statistical value of the common secret $g^{ab\sim}$ and $g^{\sim ab}$ calculated by each of the entities, via the encryption of the message or pair nonce via the common secret and its verification by the pair after decryption.

$$g^b \to M(g^b) = g^{b1} g^{b2} g^{b3} g^{b4} \ldots g^{bm}$$

Similarly, in the case of an attack on a portion of the paths or of a loss in QoS of a portion of the paths, A recovers a certain number of unmodified segments: $g^{bi}$ $g^{bi+1}$ ... $g^{bi+l}$ and recovers j segments modified either by an attacker, or by a network error: $g^{f1}$ $g^{f2}$ ... $g^{fj}$ with j+l<m.

The two parties A and B will then regenerate the common secret by recalculating the inverse Mojette transform of all the combinations of o segments and by choosing the value that is statistically most represented: $g^{ab\sim}$ and $g^{\sim ab}$ (in the practical case, a trigger will be set in order to shorten the computation time).

In the case of the party A, the calculation implemented is as follows:

$$g^{ab\sim} \to \max(M^{-1}(g^{vi} g^{vi+1} g^{vi+2} \ldots g^{vi+o}), \text{ with } g^{vi} \text{ belonging to } [g^{bi}, g^{fi}]).$$

In the case of the party B, the calculation implemented is as follows:

$$g^{\sim ab} \to \max(M^{-1}(g^{vi} g^{vi+1} g^{vi+2} \ldots g^{vi+o})), \text{ with } g^{vi} \text{ belonging to } [g^{ai}, g^{hi}].$$

Once the two secrets assumed to be common have been calculated, $g^{ab\sim}$ for A, and $g^{\sim ab}$ for B, the party A sends a verification message corresponding to the nonce $N_b$ from B encrypted with the key generated via the common secret: $g^{ab\sim}$ and sends it to the party B: $\{N_b\}g^{ab\sim}$. B then decrypts the message from A with his key $g^{\sim ab}$ and checks consistency with his nonce $N_b$, then refers to the acknowledgment message in the same way: $\{N_a\}g^{\sim ab}$ to validate the negotiation of the common key between the two entities.

This principle makes it possible to withstand a number of MIM (Men-in-the-Middle) type attacks, with implementation of a decision (representativeness of a datum with regard to the total number of combinations) in order to retain the most consistent value $g^x$.

Similarly, this principle makes it possible to validate the integrity of the data $g^x$ in the communication. In practice, if all the possible combinations of o segments give the same result, we can conclude that there has been no modification of the communication, intentional or otherwise.

Format of the Distributed Diffie-Hellman Protocol

In the context of the example given for an ad hoc network, the distributed protocol for negotiating keys is, for example, implemented by incorporating it in a representative manner (DHD identifier) as diagrammatically represented in FIG. 4, in the datum of the ad hoc protocol format.

Frame identifier: IDO
Source reference or nonce: $N_s$,
A segment or a concatenated portion of segments: $S_s$,
Each of the segments will be represented by:
Identification of the DH policy (elliptical, polynomial, etc.)
Projection identifier: IDP,
Number of segments: NS,
Segment data: DS, according to the DH method.

In the context of application to an IPv6 network, in which the distributed protocol for negotiating keys is seen as option IPv6, as represented in FIG. 5, the method includes the following fields:

Option identifier: IDO,
Source reference or nonce: $N_s$,
A segment or a concatenated portion of the segments: $S_s$,
Each of the segments will be represented by:
DH policy identifier (elliptical, polynomial, etc.): PDH
Projection identifier: IDP,
Number of segments: NTS,
Segment number: NS,
Segment data: DS on x octets, according to the DH method.

The method and the system according to the invention notably offer the following advantages:

The method uses a number of distribution paths by decomposing the information between the two parties in order to communicate only a portion of the public value to each of their neighbors; if one or more attackers try to modify the DH value of each of the final parties, he or they can only modify a certain percentage thereof, which is all the lower as the breakdown number increases.

It is not necessary for the users to have pre-shared keys or certificates via an off-communication organizational means.

The system consisting of the two entities is sufficient in itself, and makes it possible to create a secured channel by using the distribution of elements that are redundant and insensitive unitarily.

The system is autonomous and, in normal operation, has no key management center, an advantage in an ad hoc network where the management of the keys is a problem that is currently unresolved by the prior art.

The protocol according to the invention does not require any keys or certificates pre-shared between the two entities. Each entity needs to be able to recalculate the common secret from a redundant set of portions of the original secret and verifies the consistency of this secret between the two entities.

Without departing from the framework of the invention, the method and the system according to the invention can be implemented on security equipment or solutions that allow for a minimum of configuration for the user, and notably, in the calculation and the sharing of the pre-shared secret. In this context, it is possible to use it in the systems available on the civilian market, such as VoIP telephones, mobile terminals, but also items of touch radio equipment that need to use an ad hoc network in the context of localized deployment and which have a need to secure communications over a given short time period.

The invention claimed is:

1. A method making it possible to distribute elements for generating one or more cryptographic keys between at least two users A and B in a network comprising a number of nodes Ni interlinked by means of communication highways, the network implementing a routing protocol, comprising at least the following steps:

to communicate with B, A generates a public value that is sensitive to a malicious attack in which a third party seeks to pass himself off as a participant in the network, or "MIM", and decomposes it using a mathematical transformation into m segments of redundancy o, that is to say that an information item can be recomposed from o segments, and transmits this concatenated information with a reference message $N_a$ over the network via k routing paths, to communicate with A, B generates a public value that is sensitive to an MIM attack and decomposes it using the mathematical transformation into m segments of redundancy o, that is to say that an information item can be recomposed from o segments, and transmits this concatenated information with a reference message $N_b$ over the network via k routing paths, the two parties A and B regenerate the common secret by recalculating the inverse calculation of the mathematical transformation of all the combinations of o segments and by choosing the value that is statistically most represented: $g^{ab\sim}$ for A and $g^{\sim ab}$ for B, once the two secrets assumed to be common have been calculated, $g^{ab\sim}$ for A, and $g^{\sim ab}$ for B, the party A sends a verification message corresponding to the reference message $N_b$ from B encrypted with the common secret: $g^{ab\sim}$ and sends it to the party B: $\{N_b\}g^{ab\sim}$, B then decrypts the message from A with his key $g^{\sim ab}$ and checks consistency with his reference message $N_b$, then refers to the acknowledgment message in the same way: $\{N_a\}g^{\sim ab}$ to validate the common secret between the two entities, and to use the common secret to encode a message, wherein the step for regenerating the common secret comprises the following steps:

in the case of the party A, the following calculation applies:

$$g^{ab\sim} \rightarrow \max(M^{-1}(g^{yi}g^{yi+1}g^{yi+2}\ldots g^{y+o})),$$

with $g^{yi}$ belonging to $[g^{bi}, g^{fi}]$, wherein $[g^{bi}, g^{fi}]$ are segments recovered by party A, with $g^{bi}$ being unmodified segments belonging to the m segments transmitted by B, and with $g^{fi}$ being segments modified from the m segments transmitted by B, wherein $M^{-1}(g^{yi} g^{yi+1} g^{yi+2} \ldots g^{y+o})$ calculates values of the inverse calculation of the mathematical transformation of all the combinations of o segments from $[g^{bi}, g^{fi}]$, and wherein max( ) chooses the statistically most represented value from the values calculated by $M^{-1} (g^{yi} g^{yi+1} g^{yi+2} \ldots g^{y+o})$; and in the case of the party B, the following calculation applies:

$$g^{-ab} \to \max(M^{-1}(g^{yi}g^{yi+1}g^{yi+2}\ldots g^{y+o})),$$

with $g^{yi}$ belonging to $[g^{ai}, g^{hi}]$, wherein $[g^{ai}, g^{hi}]$ are segments recovered by party B, with $g^{ai}$ being unmodified segments belonging to the m segments transmitted by party A, and with $g^{hi}$ being modified from the m segments transmitted by party A, wherein $M^{-1}(g^{yi} g^{yi+1} g^{yi+2} \ldots g^{y+o})$ calculates values of the inverse calculation of the mathematical transformation of all the combinations of o segments from $[g^{ai}, g^{hi}]$, and wherein max( ) chooses the statistically most represented value from the values calculated by $M^{-1}(g^{yi} g^{yi+1} g^{yi+2} \ldots g^{y+o})$.

2. The method as claimed in claim 1, wherein the reference message $N_a$, $N_b$ for the parties A and B is a random variable.

3. The method as claimed in claim 1, wherein the mathematical transform is a Mojette transform.

4. The method as claimed in claim 1, wherein the Diffie-Hellman protocol is used to generate the public value sensitive to the MIM.

5. The method as claimed in claim 1, wherein the Reed-Solomon protocol is used to generate the public value sensitive to the MIM.

6. The method as claimed in claim 1, wherein the network is an ad hoc network.

7. The method as claimed in claim 1, wherein the routing protocol is a proactive protocol.

* * * * *